United States Patent [19]

Wolk

[11] Patent Number: 4,480,186

[45] Date of Patent: Oct. 30, 1984

[54] COMPENSATED DENSITY WELL LOGGING TOOL

[76] Inventor: Piero Wolk, 1717 Britmore Rd., Houston, Tex. 77043

[21] Appl. No.: 380,266

[22] Filed: May 20, 1982

[51] Int. Cl.³ .......................... G01V 5/12; E21B 23/00
[52] U.S. Cl. ..................................... 250/268; 166/113
[58] Field of Search ...................... 250/268, 266, 265; 175/77, 78; 166/214, 113

[56] References Cited

U.S. PATENT DOCUMENTS

| | | | |
|---|---|---|---|
| 3,187,824 | 6/1965 | Gauban | 175/78 |
| 3,254,221 | 5/1966 | Saurenman | 250/268 |
| 3,321,625 | 5/1967 | Wahl | 250/268 |
| 4,120,353 | 10/1978 | Roesner | 166/65 R |

Primary Examiner—Janice A. Howell
Assistant Examiner—Constantine Hannaher
Attorney, Agent, or Firm—Guy E. Matthews

[57] ABSTRACT

Disclosed is an improved compensated density well logging apparatus which provides a mechanical linkage driven by an electric gear motor for extension of a thin cylindrical pad containing radioactive source and detection equipment exteriorly of the tool housing so as to penetrate the filter cake and eliminate or reduce the distorting effect of the filter cake and well bore fluid. A spring biased caliper arm is used to justify the tool and extended pad against the side of a well bore during measurement. The linkage supporting and positioning the caliper arm includes a pivot pin which extends exteriorly of the tool housing to engage two parallel aligned guide wheels riding in grooves formed exteriorly in the tool housing so as to reduce friction and prevent lateral movement of the linkage. This provides for a more accurate reading of the variable thickness of the filter cake and well bore diameter at varying depths within the well bore.

A linear motion transducer including a Titanium shell is used to translate the instantaneous position of the caliper arm with respect to the tool housing into a measurement of the well bore diameter and filter cake thickness. The linear motion transducer is encapsulated in a resilient bellows filled with a low viscosity fluid which is pressure equalized with the drilling fluid so as to facilitate the rapid movements of the caliper arm and linkage. A slot engaging a pin within the caliper arm linkage allows the complete retraction of the caliper arm without affecting the fully extended position of the radioactive pad. Two linearly aligned springs of different spring load constants are utilized to maintain a constant and linearized force urging the caliper arm outward with respect to the tool housing.

16 Claims, 9 Drawing Figures

COMPENSATED DENSITY WELL LOGGING TOOL

FIELD OF THE INVENTION

The present invention relates generally to devices for measuring subsurface formation densities in an open well bore. More specifically, the present invention relates to a compensated density radioactive well logging tool.

BACKGROUND OF THE INVENTION

Compensated density radioactive well logging tools have been in wide use in the search for subsurface hydrocarbon deposits. Typically such tools have been lowered by cable or wireline after completion of a well and prior to insertion of the casing, then drawn upwardly through the well while emitting a controlled amount of radiation. The radiation impacting on the various subsurface formations generates backscatter gamma ray radiation in inverse proportion to the density of the structure and which may be measured by the tool.

However, the level of backscatter radiation may be affected by various aspects of the well bore, subsurface formation, and of the tool, to the detriment of the accuracy of the observed density reading. The presence of filter cake coating the sides of the well bore, as well as the presence of drilling fluid within the well bore, greatly affect the measurements in that these substances differ in density from the actual subsurface formation. Moreover, inaccurate placement of the radioactive source and detection equipment within the well bore may also reduce the effectiveness of measurement operations. Various approaches have been tried in the past to overcome this distorting affect, such as to bias the radiation source and detectors to one side of the well bore thereby reducing the amount of intervening material. At the same time, multiple detectors or groups of detectors have been placed in vertically spaced relation to the radiation source, whereby the signals from the various groups may be compared and correlated, maximizing the effect of the subsurface formation and minimizing the effect of the filter cake and drilling fluid on the observed density reading.

For instance, U.S. Pat. No. 3,321,625, issued to Wahl, shows a device having a spring loaded arm which contacts the well bore at a point opposite that of the radiation source and detectors so as to position them against the well bore wall. The position of the spring biased ar within relation to the body of the tool at a given time is measured by a potentiometer. This reading is used to help interpret the measurement of formation density, since it is an indication of varations in well bore diameter and filter cake thickness at various points within the well bore. However, it will be noted that due to the size and shape of the pad containing the radioactive source and detectors, there remains a substantial amount of interfering material between the tool and the subsurface formations.

U.S. Pat. No. 4,120,353, issued to Roesner, shows a mechanical linkage apparatus which converts a powered longitudinal movement within the tool into radial extension of a pad containing the measurement equipment, as well as a resiliently biased caliper arm, as in Wahl. The linkage includes a series of bell crank arms, pivot points and cams to achieve the outward extension. However, it will be noted that in smaller diameter well bores, the retraction of the caliper arm in Roesner necessarily requires a proportional retraction of the pad. This shift seriously affects the linearity of the readings of the tool over various well bore diameters and reduces its overall effectiveness.

Therefore, it becomes desirable to construct and use a compensated density well logging tool which will eliminate or reduce the effect of drilling fluid and the filter cake on the observed density of subsurface formation and provide precise density measurements requiring less correction for a wide range of open well bore diameters.

SUMMARY OF THE INVENTION

The compensated density well logging tool of the present invention incorporates separate mechanical linkage assemblies including a caliper arm so as to bias the tool against the side of a well bore, as well as to partially extend a thin, cylindrical pad containing the radioactive source and detection equipment beyond the tool housing and into the filter cake coating the sides of the well bore.

The mechanical linkage supporting the caliper arm includes a slot formed at one of the pivot points which allows complete retraction of the caliper arm within the tool housing without affecting the position of the extended pad. A pivot pin within the caliper arm linkage extends outwardly to engage two guide wheels which slide longitudinally in grooves formed on the outside of the tool housing so as to reduce friction entailed in movement of the caliper arm and to prevent lateral shifting of the linkage assembly.

Two linearly aligned springs are used to resiliently urge the pad into its extended position and the caliper arm radially outward respect to the tool housing. An electric gear motor which controls a drive shaft connected to the mechanical linkage is used to restrain the caliper arm and pad within the tool housing when lowering the tool into a well bore. Upon reaching the desired depth, the drive shaft is extended longitudinally, which allows the combined force of the two springs to urge the caliper arm and pad outwardly. A plurality of replaceable wear buttons are mounted on the outside of the pad and support linkage to allow unrestricted emission and reception of radiation and yet prolong the useful life of the pad structure and material. A linear motion transducer is incorporated into the drive shaft so as to convert the instantaneous position of the caliper arm with respect to the tool housing into an electronic signal. This signal is a measurement of the well bore diameter and filter cake thickness and allows compensation of the observed density readings. The linear motion transducer is surrounded by a resilient bellows which is filled with a low viscosity fluid. The resilient bellows allows equalization of pressure between the ambient drilling fluid and the hydraulic fluid contained therewithin while protecting the linear motion transducer from contamination by the drilling fluid.

Therefore, it is a principal feature and advantage of the present invention to provide a new and improved compensated density well logging tool.

Therefore, this and numerous other features and advantages will become more clearly evident upon a detailed examination of the following description, claims, and drawings, wherein like numerals denote like parts into several views and wherein:

DETAILED DESCRIPTION OF THE INVENTION

Figure 3:
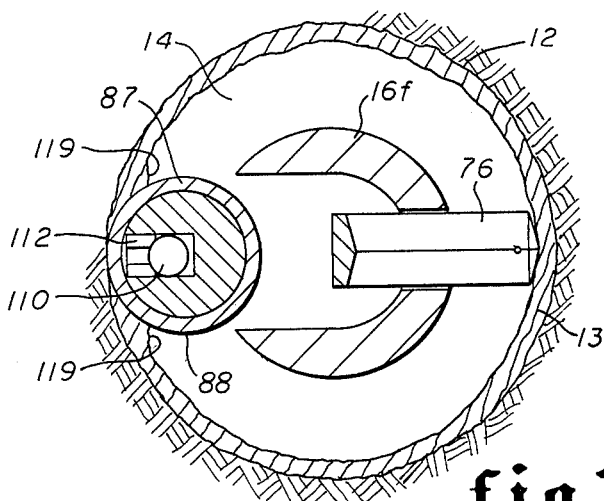
FIG. 3 is a cross sectional view of the present invention along plane 3—3 of FIG. 1d illustrating the pad and caliper arm in an extended mode.

Referring now to FIGS. 1a–1d, the numeral 10 generally indicates the radioactive well logging tool of the present invention. The tool 10 may be suspended at an upper end by a cable or a wire line 11 within an open well bore 12 coated with filter cake 13 and containing drilling fluid 14, as illustrated in FIG. 3. The tool is connected to the cable 11 by a coupler 15. In the embodiment illustrated in FIG. 1a, the coupler 15 may be connected or disconnected to the tool 16 by a spanner wrench or the like (not shown) engaging indentations 15a. The tool includes a housing 16 substantially hollow and generally cylindrical in cross section. The tool housing 16 may include a plurality of threadedly connected sections which facilitate the assembly of the tool, as will be evident upon a further examination of the description hereinbelow.

Specifically, the housing 16 as illustrated in FIGS. 1a–1d, may include the section 16a connected to the coupler 15, section 16b connected to section 16a at 98 and section 16d at 17, section 16c connected to section 16d at 18, section 16e connected to section 16d at 19, section 16f connected to section 16e at 20 and may further include section 16g, adapted to guide the tool downward through the well bore and connected to section 16f at 21. Section 16g may include a bore 22 defining openings 23 and 24 and internal surface 25 for passage of drilling fluid interiorly of the tool to enhance elimination of build-up of mud in cavity 28 while submerged within the well bore. The housing 16f also defines a first slot 26 and a second slot 27 communicating with the interior 28 of the tool.

Mounted within section 16a is an electric power source 29, sealed by O-ring 30. A plurality of electrical leads 31 connected to the electric power source 29 penetrate the base 32 of section 16a through openings 33 to a wiring harness 34 (partially shown) which transmits electricity to other components of the tool requiring electric power for operation. The wiring harness may further include a portion extending upwardly with the wireline 11 to receiving and control devices at the surface and for receiving other informational signals. Sealing material 35 seals the leads 31 within the opening 33 and prevents exposure of the electric power source 29 to low viscosity fluid 38 during use.

An electric gear motor 36 is mounted on section 16c, within section 16b, by a threaded connection at 37. The electric gear motor 36 is connected to the wiring harness 34 and is exposed to a low viscosity fluid 38 within section 16b, whose purpose will be explained later. A threaded gear motor shaft 39 is powered by the gear motor 36 and threadedly engages a drive nut 40 at 44, whereby rotation of the gear motor shaft will be converted into longitudinal movement of the drive nut within the tool. The drive nut 40 is slidingly in contact with section 16c for support and guidance.

An upper limit switch 41 and lower limit switch 42, having respective contacts 41a and 42a, are mounted on section 16c in alignment with depression 43 formed on the drive nut 40. The drive nut 40 threadedly connects to upper drive shaft portion 47, which slidingly engages bearing surface 45 formed in section 16d. A seal or O-ring 46 is mounted between section 16b and 16d to prevent loss or contamination of the low viscosity fluid 38.

The upper drive shaft portion 47 threadedly connects at 48 to shell 49 of a linear motion transducer assembly 50. A linear motion transducer coil 51 is mounted within the shell 49 for generating magnetic fields, energized by the electric power source 29 through the wiring harness 34. In one embodiment of the invention, the shell 49 is constructed of Titanium, which minimizes eddy currents tending to distort readings of the linear motion transducer, evident when other materials are present. A pin 52 is inserted into the shell 49 through opening 53 and further into coil 51 of linear motion transducer 50 and includes a shoulder 54 which restrains downward motion of the pin.

A resilient elastomeric bellows 55 sealing encapsulates the linear motion transducer assembly 50 and retains the low viscosity fluid 38 therewithin. The bellows 55 is mounted on section 16d by a clamp 56 and to a lower drive shaft portion 57 by a clamp 58. The lower drive shaft portion 57 connects to pin 52 which extends longitudinally and is threadably engaged at 52' to drive shaft portion 57. As illustrated in FIG. 1b, a plurality of openings 59 are formed in section 16e to enable the pressure in the well bore to be exerted upon the bellows 55. The bellows 55 prevents intermixing of the low viscosity fluid 38 and the drilling fluid 14, and also equalizes pressure therebetween, because of the flexibility of the bellows membranes.

A plurality of bolts 60 are recessed within sockets 61, formed within section 16e and 16f and are threadedly connected to concentric spring stop 62 so as to affix the spring stop to sections 16e and 16f at juncture 20. Spring stop 62 and bolts 60 act to secure the connection between section 16e and 16f. The spring stop 62 is also in contact with first and second springs 63 and 64, separated by shoulder washer 65, encircling lower drive shaft portion 57. The composite force exerted by the first and second springs 63 and 64 are directed downward against traveling block 66, connected at 67 to the lower drive shaft portion 57.

Figure 4:
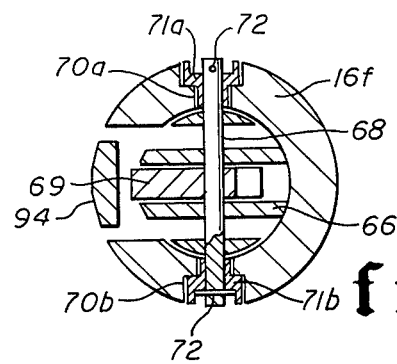
FIG. 4 is a cross sectional view of the present invention along plane 4—4 of FIG. 1c.

A pin 68, illustrated in cross section in FIG. 4, rotatably connects traveling block 66 with yoke 69 and passes outwardly through aligned opposing grooves 70a and 70b, formed in section 16f. The pivot pin 68 engages guide wheels 71a and 71b secured by cotter pins 72. The guide wheels 71 act to reduce friction inherent in the movement of the assembly herein described and further prevents lateral movement of the yoke and traveling block under stress.

Figure 5:
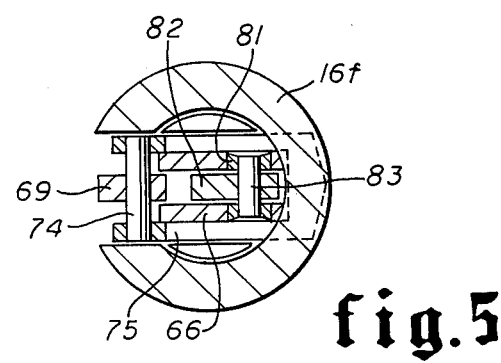
FIG. 5 is a cross sectional view of the present invention along plane 5—5 of FIG. 2.
Figure 6:
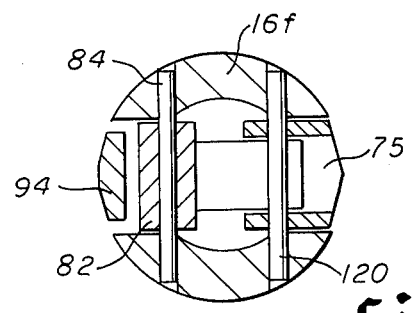
FIG. 6 is a cross sectional view of the present invention along plane 6—6 of FIG. 1c.

The yoke 69 includes caliper slot 73 slidingly engaging pin 74, shown in cross section in FIG. 5. Pin 74 is mounted on caliper crank portion 75, which is rotatably connected to the section 16f by pivot pin 120, illustrated in cross section in FIG. 6. Caliper crank portion 75 forms a portion of the caliper arm 76, illustrated in FIGS. 1c and 1d extending downwardly in second slot 27, flush with the exterior of the tool. Caliper arm 76 may include a wear block 77 mounted thereon by one or more bolts 78, to permit periodic replacement. The pivot pin 120 enables radial movement of the caliper arm 76 along direction 79 in response to movement of the crank portion 75.

Referring again to traveling block 66, a cam slot 80 is formed therein, comprising two sections, 80a and 80b. In one embodiment of the invention, section 80a is inclined between 50° to 70° with respect to section 80b. A cam wheel 81 is rotatably mounted on the upper end of first pad support arm 82 by pin 83 and is slidably constrained within slot 80. The first pad support arm 82 may be pivotally mounted to section 16f by pin 84 enabling rotation of the arm with respect thereto guided by cam wheel 81 in cam slot 80. The lower end of first pad support arm 82 may further include pin 97 slidingly engaging slot 85 formed in bracket 86. The pin 97 is mounted so as to center the bracket 86 with respect to the first pad support arm 82. The bracket 86 is mounted on hollow pad housing 87 of pad 88, preferably at the axial center of gravity thereof. An upper pad end cap 89 is mounted on the pad housing 87 and includes O-ring 90. A lower end cap 91 is mounted on the lower end of pad housing 87 with O-ring 92, sealing the interior 93 of the pad 88 from drilling fluid 14 or the like. A second pad support arm 94 is pivotally connected to the upper pad end cap 89 by pin 95 and to section 16f by pin 96. The second pad support arm 94 cooperates with the first pad support arm 82 in positioning and supporting the pad 88 during measurement operations in conforming with well bore irregularities.

Mounted within the pad housing 87 is a pad interior member 100. A bore 99 is defined through the lower pad end cap 91 and pad interior member 100 and contains radioactive source material 101. A number of materials have been utilized as radioactive sources, however cesium 137 has proved to be useful for over a wide range of enviroments and conditions under which the present invention operates. The pad interior member 100 is constructed with a material such as tungsten, opaque to the radiation emitted by the radioactive source 101, whereas pad housing 87 is relatively transparent thereto. A radiation window 102 is found within the pad interior member for the controlled directional emission of radiation exteriorly of the tool. Exposed subsurface formations irradiated by the source 101 generate backscatter radiation in the form of gamma rays in inverse proportion to their density. The backscatter radiation may be detected and the measurements calibrated to obtain a log of the densities of the formations at various depths within the well bore.

A source holder 103 threadedly engages the lower pad end cap 91 to maintain the radioactive source 101 in position. The holder 103 may include a hex head 104 or other suitable means for engagement when installation or removal is desired. A plug 105 may also be threadedly mounted within the lower end cap 91 cooperation with O-ring 106 so as to prevent the admission of drilling fluid 14 into pad 88 or the loss of radioactive source material 101 into the environment. Plug 105 may also include a hex head 107 or the like to facilitate installation or removal.

The pad interior member 100 defines short and long space windows 108 and 109, in spaced relation and linearly aligned with respect to radioactive source 101. Contained within the respective collimating windows 108 and 109 are short and long space radiation detectors 110 and 111. Various devices have been used to detect backscatter radiation in compensated density well logging tools, such as scintillation counters. However, in the preferred embodiment of the invention, the radiation detectors comprise Gieger-Mueller tubes. In one embodiment of the invention, the short space detector 110 includes one Gieger-Mueller tube, where as the long space detector 111 includes two tubes, 111a and 111b.

It is evident that precise positioning of the radiation detectors 110 and 111 is critical with respect to the radiation source 101. Spacing is dictated by the characteristics of the particular devices and materials used. In proximity to the radioactive source 101, the level of backscatter radiation will be relatively intense. Placement of the detectors 110 and 111 too near the source will lend them susceptible to saturation. Saturation occurs when the time interval between detected radiation impulses is shorter than the recovery time of the detector. Conversely, placement of detectors 110 and 111 at too great a distance from the source will reduce the amount of backscatter radiation to an undetectable level. Consequently, a second Gieger-Mueller tube 111b in the long space radiation detector 111 may be included to increase the reception of radiation impluses at greater distances.

The short space detector 110 may include a collimating shield 112 constructed of a shielding material such as lead having a window 113. The arrangement of the collimating shield 112 adjacent the short space detector 110 prevents saturation while allowing exposure to a relatively high level of radiation. By utilizing a collimating window and avoiding the use of filters, as on existing designs, the short space detector 110 is exposed to the same spectra of gamma ray radiation as the long space detectors 111, facilitating the comparison of their respective signals. This comparison of observed density readings at differing distances from the radioactive source is utilized to compensate for the presence of filter cake and drilling fluid. The path of the radiation detected by the short space detector crosses a portionally larger layer of filter cake and is strongly influenced thereby. The path of radiation detected by the long space detector 111 provides a signal more influenced by the well bore formation 12 than by the filter cake 13. The comparison of the respective readings increases the overall accuracy of the measurement of the formation density.

Figure 1A:
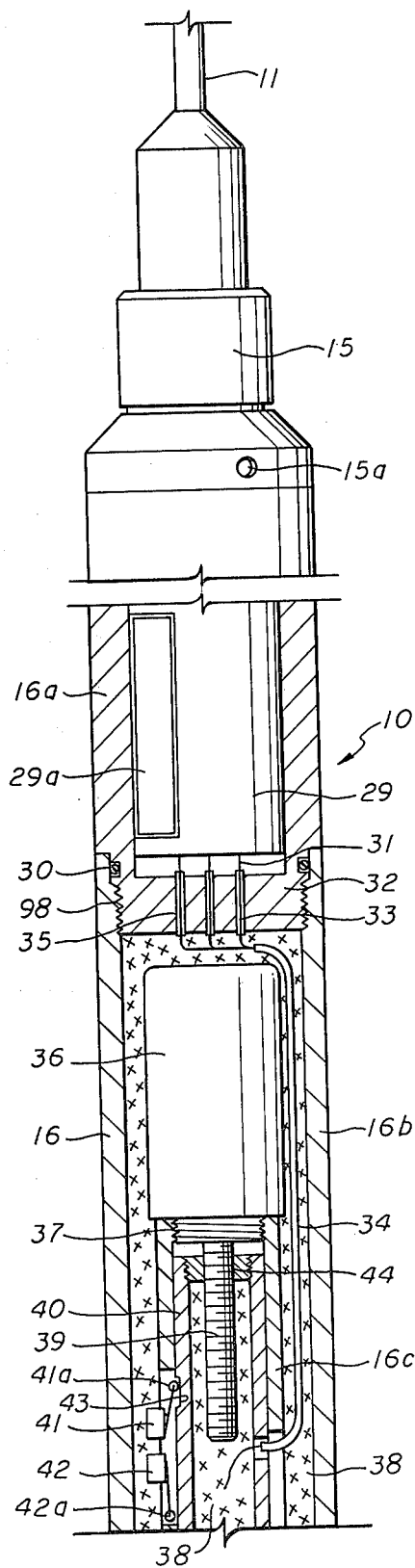
FIGS 1a–1d are segmented cross sectional views of the present invention.
Figure 1B:
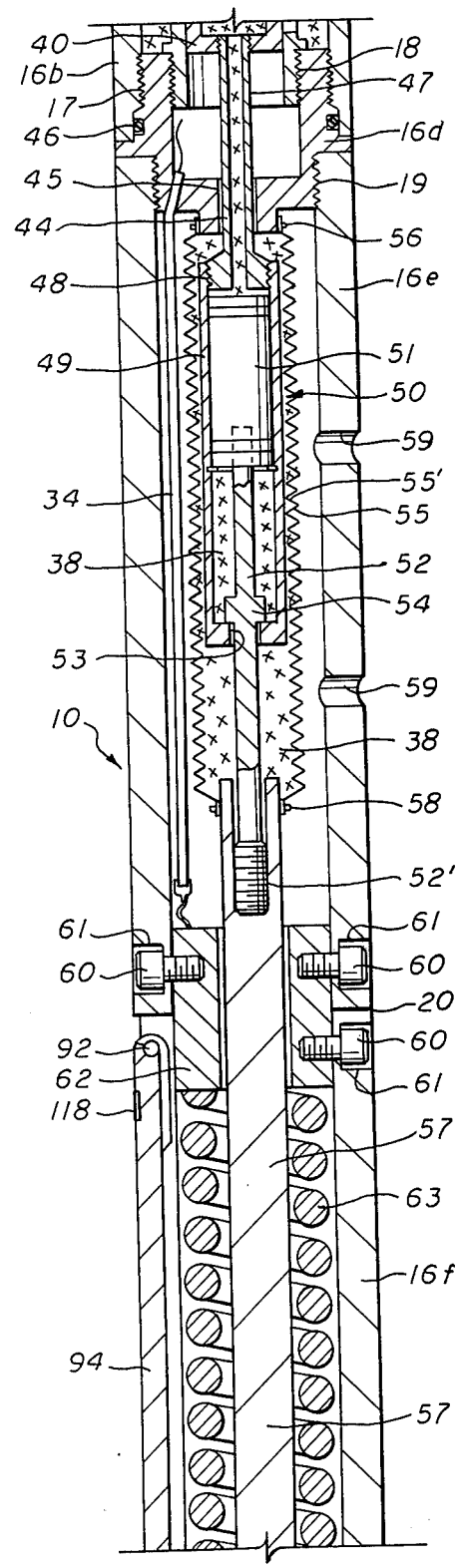
Figure 1C:
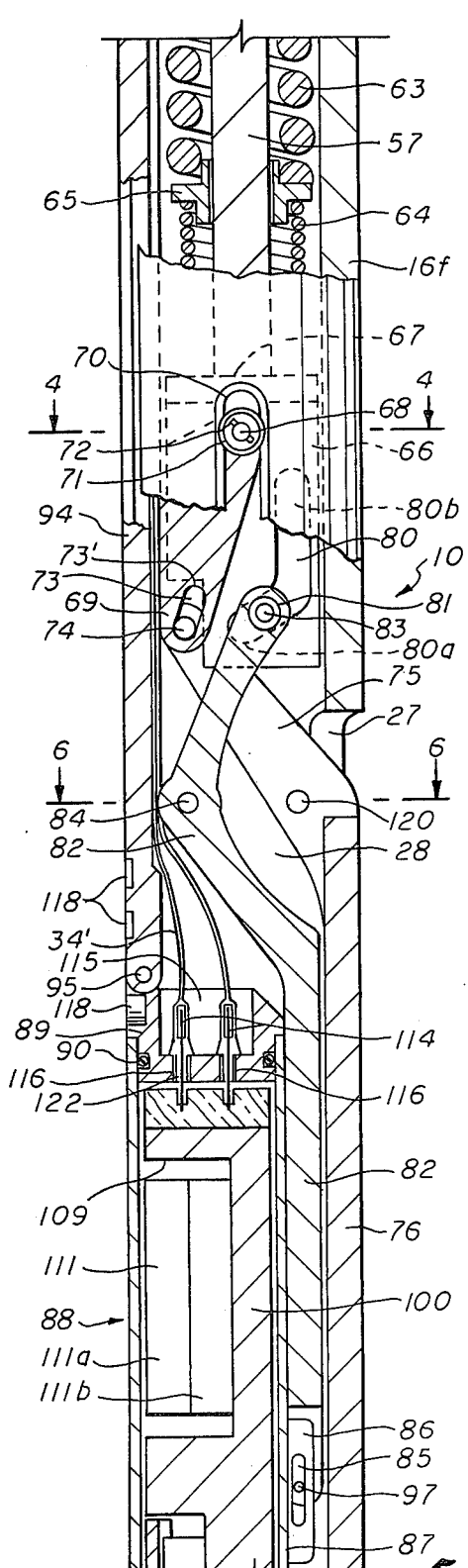
Figure 1D:
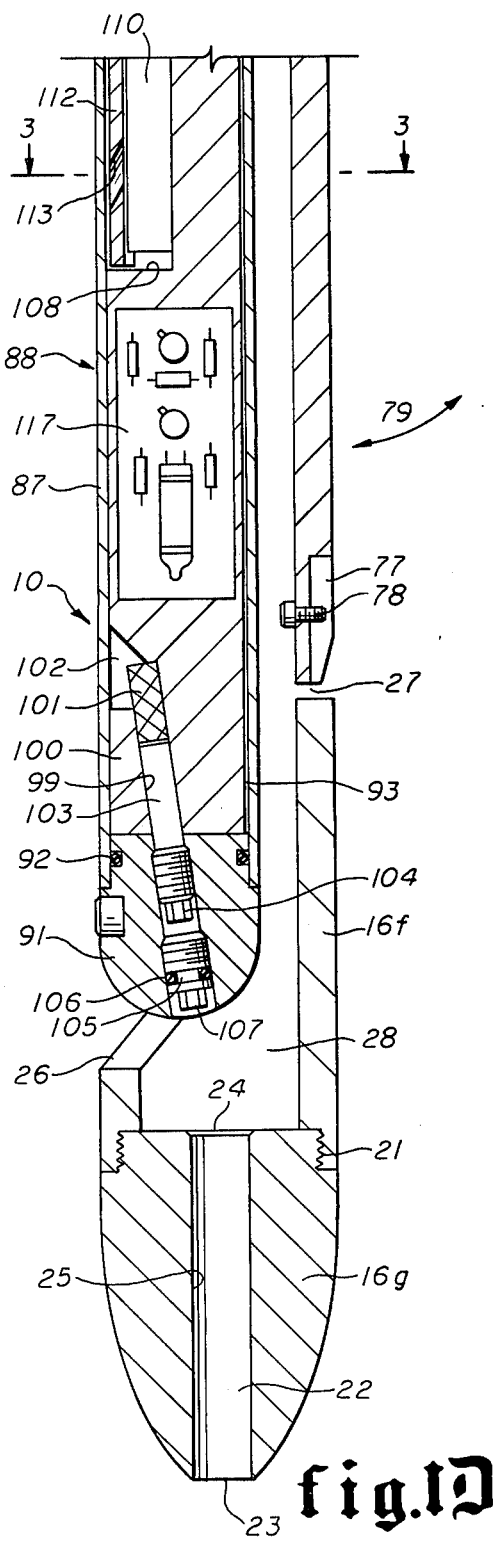

In an alternative embodiment of the invention, an additional measuring function may be performed by a natural gamma ray detector 29a connected to the wiring harness 34, and mounted on the electric power source 29, as illustrated in FIG. 1a. The natural gamma ray detector 29a may comprise a Gieger-Mueller tube, as in the case of the short and long space detectors 110 and 111. By locating the natural gamma ray detector in the upper section 16a of the tool, only the ambient level of radiation in the well bore 12 formations is detected. The radiation source 101 does not influence this measurement. The observed radiation measurements of the short and long space detectors 110 and 111 may be reduced by the level of natural background radiation. Previous designs have required a separate attachment with a natural gamma ray detector, which is obviated by the compact design of the present invention.

It will be noted that a portion 34 of the wiring harness 34 extends down through a plurality of connectors 114 mounted within openings 116 formed in a recess 115 in the upper pad end cap 89 sealed by a high temperature thermosetting plastic 122. The wiring harness is further connected to electronics module 117 mounted on the pad interior member 100. The electronic module 117 receives signals from the short and long space detectors 110 and 111, processes and transmits them through the wiring harness exteriorly of the tool. Although the electronics module 117 is illustrated as being wholly contained within the pad 88, it is possible to place some components at other locations within the tool as desired.

In one embodiment of the invention, the electronics module 117 is mounted within the pad interior member 100 between the short space detector 110 and the radiation source 101. This provides for a compact pad 88 configuration, improving the ability of the pad to conform to irregularities in the well bore wall 12. Additionally, by securing the device 117 to the dense material of the pad interior member 100 which acts as a damper, vibration and shock forces are reduced. Thus, the reliability of the electronics module is increased.

A plurality of replaceable wear buttons 118 may be mounted on the pad 88 and second pad support arm 97 on surfaces in contact with well bore formations 12. Previous approaches involved applying a coating of tungsten carbide or like wear resistant material to the entire contact surface; however, the layer of tungsten carbide also partially shields the radiation source 101 and radiation detectors 110 and 111 from the well bore formation, thus distorting their response.

In operation, the compensated density well logging tool 10 of the present invention is lowered through well bore 12 by wire line 11 connected to a lowering mechanism (not shown) at the surface, with the pad 88 and the caliper arm 76 fully retracted within the tool housing 16, as illustraded in FIGS. 1a-1d. Upon reaching the desired depth within the well bore, the electric power source 29, directed by the controlling devices at the surface, activates the electric gear motor 36. Drive nut 40, upper drive shaft portion 47, and shell 49 are lowered within the tool by rotation of the gear motor shaft 39. The downward movement continues until the contact 42a enters the depression 43, at which point the lower limit switch 42a is opened and the gear motor 36 is deactivated, or movement may be halted at some intermediate point as desired. The pin 52, lower drive shaft portion 57, and traveling block 66, previously restrained by shoulder 54 against the composite force exerted by first and second springs 63 and 64 on the traveling block 66, are now enabled to shift downward in response thereto.

Figure 2:
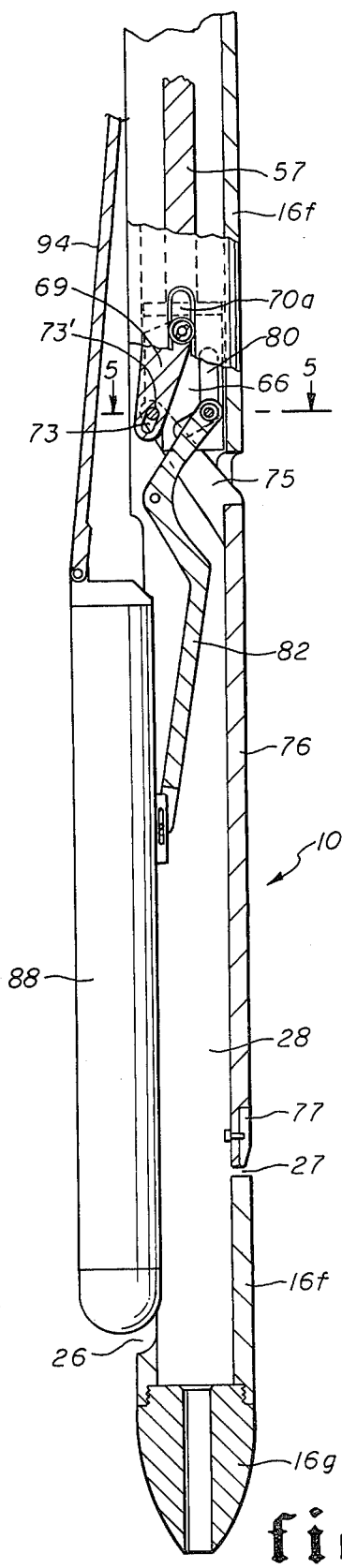
FIG. 2 is a side view of a segment of the present invention illustrating the pad in extended mode.

During downward movement of the traveling block 66, the cam wheel 81 follows cam slot 80. Initially, the cam wheel occupies section 80a, with the pad 88 retracted. Movement of the cam wheel 81 towards section 80b rotates first pad support pad arm 82 around pivot pin 84, pushing pad 88 outward through first slot 26. Upon the cam wheel 81 reaching section 80b, as illustrated in FIG. 2, the pad 88 will be fully extended to a fixed position with respect to the tool housing 16. In the preferred embodiment of the invention, the pad 88 is not completely protruding, but remains partially within the interior 28 of the tool housing. Further downward movement of the traveling block 66 will not affect the position of the pad 88, as the cam wheel will merely traverse longitudinally aligned section 80b. It is evident that an inclination of 50° to 70° between cam sections 80a and 80b enables the pad 88 to be shifted to its extended position over a shorter longitudinal shift of the traveling block within the tool housing than previous designs having a corresponding inclination of 45° or less.

When the cam wheel 81 enters section 80b, the caliper arm 76 has not been affected by the downward movement of the traveling block 66 due to slot 73 in yoke 69. That is, until the pin 74 contacts the end 73' of the slot 73, as illustrated in FIG. 2, no force is transmitted to the retracted caliper arm. It is evident, therefore, that the present invention is fully operational with pad 88 fully extended, in relatively small well bore diameters equal to the diameter of the tool housing 16 plus the outward distance of the extended pad.

The pad 88 of the present invention preferably includes a housing which is a thin cylinder as opposed to well bore conforming and relatively large configurations of conventional designs. The pad of the present invention thus has the advantage of being capable of pentrating the softer layers of the filter cake 13 coating the well bore. To the extent that this is accomplished, the pad 88 is better able to conform to well bore irregularities, the radiation source 101 and detectors 110 and 111 are placed closer to the well bore formations desired to be measured, and the accuracy of the readings is increased. Further, the displaced filter cake material 13 tends to form fillets 119, as shown in FIG. 3, which exclude drilling fluid from the contact area, further increasing the accuracy of the reading.

Conventional designs, such as U.S. Pat. No. 4,120,353, issued to Roesner, require the simultaneous retraction of both pad and caliper arm when the caliper arm extension approaches approximately twice the diameter of the tool housing. The partial retraction of the pad seriously affects the ability to penetrate the filter cake, reducing its sensitivity. Also, by altering the position of the pad with respect to the tool over various well bore diameters the observed density reading is materially affected.

For larger diameter well bores 12, typically at shallower depths, it is necessary to radially extend the caliper arm 76 so as to contact the well bore 12 wall, as illustrated in FIG. 3. Further downward movement of the traveling block 66 will induce rotation of the caliper arm 76 around pin 120 under the composite influence of the springs 63 and 64. Once the pad 88 and caliper arm 76 assume their extended positions, the tool 10 is drawn upward slowly through the well bore 12 to the surface by the lowering mechanism. The responses of the short and long spaced detectors 110 and 111 are continuously processed and transmitted to the surface by the electronics module 117.

During this process, the caliper arm 76 is radially shifted along direction 79 in response to variations in the well bore 12 diameter and thickness of the filter cake 13. Changes in the position of the caliper arm 76 with respect to the tool housing 16 are transmitted through the yoke 69, traveling block 66 and lower drive shaft portion 57 to the pin 52. As is known in the art, the presence of the pin 52 produces a measurable affect upon a magnetic field generated by the coil 51. Changes in the amount of the pin 52 within the coil 51 may be calibrated and converted to an electronic signal transmitted to receiving devices on the surface through the wiring harness 34 to measure the well bore 12 diameter at various depths. The use of guide wheels 71 further improves the precision of the present invention by eliminating lateral shift of the yoke 69, traveling block 66, and caliper arm 76 while under stress, as previous mentioned, thus assuring accurate measurement of the position of the caliper arm at all times.

The linear motion transducer assembly 50 also presents advantages over potentiometers or other like devices previously used to measure the relative extension of the caliper arm 76. Whereas a linear motion transducer requires little or no maintenance, potentiometers have proved to be unreliable due to wear caused by contact between moving parts. Also by incorporating the linear motion transducer 50 into the pad 88 and caliper arm 76 retraction mechanism, a more compact design is achieved, as well as direct linear measurement of the caliper arm 76 position. Previous designs included external runners connecting the caliper arm with the measuring device, exposing the apparatus to possible interference or damage from contact with the well bore.

The low viscosity fluid 38 surrounding the gear motor 36, drive nut 40, and linear motion transducer assembly 50, acts to eliminate any pressure differential on the components responsive to shifts in the position of the caliper arm 76 caused by the extreme pressures exerted by the drilling fluid 14 in deep, narrow well bores. Conventional designs utilize dynamic sealing O-rings or packing seals in sliding contact with moving portions of the tool maintaining atmospheric pressure against the drilling fluid pressure. The present invention eliminates the friction inherent in the seals and avoids frequent replacement of worn seals or possibly failure.

The first spring 63 has a larger spring load constant than the second spring 64. When the caliper arm 76 is fully retracted or when adjacent the tool housing 16, the second spring 64 is normally fully compressed. In well bores 12 of greater diameter, the first spring 63 begins to relax when the traveling block 66 is shifted downward in response to greater radial extension of the caliper arm 76. Second spring 64 contributes to a minimum composite force which is maintained even in extreme well bore 12 diameters. This is necessitated by the continuous change in leverage ratio of the combined yoke 69 and arm 75 which would vary considerably the force exerted by caliper arm 76 over the movement 79.

Upon reaching the top of well bore, the pad 88 and caliper arm 76 may be retracted by re-energizing the gear motor 36 until it is deactivated by the opening of the upper limit switch 41. The tool 10 may then be extracted quickly from the well bore. The compensated density well logging tool of the present invention as hereinabove described, produces a more accurate and consistent observed density measurement which requires less corrective manipulation.

This invention is therefore well adapted to attain all of the objects and features as set forth hereinabove, together with other objects and features that are inherent in the invention identified herein and the apparatus shown in the accompanying drawings. It will be understood that certain combinations and subcombinations are of utility and may be employed without reference to other features and subcombinations. This is contemplated by and is within the scope of the present invention.

As many possible embodiments may be made of this invention without departing from the spirit or scope thereof. It is to be understood that all matters hereinabove set forth are shown in the accompanying drawings are to be interpreted as illustrative and not in any limiting sense.

Therefore, the invention having been hereinabove described, that which is set forth and desired to be secured by U.S. Letters Patent is:

I claim:

1. A compensated density well logging device for use with a lowering mechanism for measuring the density of subsurface formations through an open well bore coated with filter cake and containing drilling fluid and transmitting density signals to receiving devices on the surface, comprising:

(a) a hollow first housing having an upper end connected to the lowering mechanism and a lower end adapted to guide the tool downward through the well bore;

(b) a connection means mounted at the upper end of said first housing;

(c) a pad mounted with said first housing by said connection means, said pad having a second housing and a pad interior member mounted therewith in said connection means enabling the pad to be shifted from a first position within the first housing and a second position extended through a first longitudinal slot;

(d) radioactive source means mounted within the pad interior member, said pad interior member being opaque to radiation emitted thereby, said pad interior member defining directional window means for the controlled emission of radiation exteriorly of the device;

(e) a plurality of radiation detection means for detection of backscatter radiation from irradiated subsurface formations, and coversion of the level of radiation into an electronic signal, mounted on collimating windows formed in the pad interior member is spaced relation to said radiation source means;

(f) a caliper arm having a first end pivotally mounted on said first housing radially opposite said pad and a second end for extension through a second longitudinal slot so as to contact the well bore and position the device adjacent the opposite wall of the well bore during measurement operations;

(g) extension means connected to said pad connection means for urging said pad into said second position and further connected to said caliper arm for radial extension thereof so as to thrust said pad into the filter cake, said extension means enabling the shifting of said pad into said second position independently of the extension of said caliper arm;

(h) actuating means mounted on said first housing connected to said extension means for restraining the shifting of the extension of said caliper arm and pad until measurement of formation densities is desired;

(i) measurement means mounted on said actuating means responsive to the position of the caliper arm with respect to the first housing for measurement of the well bore diameter; and (j) electronic means mounted within said first and second housings for receiving, processing, and transmitting signals from said detector means and measurement means exteriorly of the device and for transmitting electric power within the device.

2. The compensated density well logging device of claim 1, wherein the pad connection means comprises first and second pad support arms, said first pad support arm having a first end pivotally connected to said pad second housing and a second end connected to said extension means and an intermediate portion forming a bell crank portion pivotally connected to said first housing so as to enable movement of said pad between said first and second positions by rotation of said first pad support arm in response to said extension means, and a second pad support arm having a first end pivotally connected to said pad and a second end pivotally connected to said first housing so as to cooperate with the first pad support arm in positioning said pad.

3. The compensated density well logging device of claim 2, wherein the extension means comprises a traveling block connected to said actuating means, said traveling block defining a cam slot, said cam slot engaging a cam wheel mounted on said second end of said first pad support arm, said cam slot being so constructed and arranged whereby movement of the traveling block will shift said pad between said first and second position, said traveling block being connected by coupling means to said caliper arm whereby movement of said traveling block enables radial movement of said caliper arm through said second slot, said traveling block being further connected to resilient means mounted within said first housing so as to urge said pad into said second position and said caliper arm outwardly, said coupling means enabling the pad to occupy said second position without extension outwardly of said caliper arm.

4. The compensated density well logging device of claim 3, wherein the cam slot comprises first and second regions, said first region being oriented 50°–70° with respect to said second region, whereby said pad assumes said first position when said cam wheel occupies said first section and said pad assumes said second position when said cam wheel occupies said second region.

5. The compensated density well logging device of claim 3, wherein said coupling means comprises a yoke having a first end pivotally connected to said traveling block and a second end including a slot engaging a pin mounted on said caliper arm, said slot being so constructed and arranged with respect to said first pad support arm, cam wheel and cam slot so as to enable movement of the traveling block whereby said pad assumes said second position without urging the caliper arm outwardly of said first housing.

6. The compensated density well logging device of claim 5, wherein the pivot pin connecting said yoke arm and said traveling block extends radially through two aligned grooves formed in said first housing, said pivot pin engaging two guide wheels constrained within said grooves, whereby frictional resistance is reduced and lateral movement of the caliper arm, yoke arm and traveling block under stress is prevented.

7. The compensated density well logging device of claim 3, wherein said resilient means comprises first and second linearly aligned springs constrained between a shoulder formed in said first housing and said traveling block so as to urge said traveling block to move relative to the tool housing, whereby said pad is shifted to said second position and said caliper arm is extended radially, said first spring having a larger spring constant than said second spring, whereby said second spring is fully compressed when said caliper arm is adjacent the tool housing and said first spring relaxing when said caliper arm is extended, whereby said second spring cooperates with said first spring so as to exert a minimum force urging said caliper arm outwardly and thus producing a constant force with said caliper arm, irrespective of its radial opening.

8. The compensated density well logging device of claim 3, wherein said actuating means comprises a drive shaft having a first end connected to said traveling block and a second end connected to an electric gear motor mounted on said first housing, said gear motor being energized by electric power source means mounted within said first housing, said gear motor having a threaded shaft engaging a threaded drive nut mounted on said drive shaft whereby rotation of said gear motor shaft will enable longitudinal movement of said drive shaft and further enabling restraint of said pad and caliper arm within said first housing when desired.

9. The compensated density well logging device of claim 8, wherein said actuating means further includes upper and lower limit switch means so constructed and arranged with respect to said electric gear motor as to automatically deactivate said gear motor when said pad and caliper arm are fully extended or retracted.

10. The compensated density well logging device of claim 8, wherein said measurement means comprises a linear motion transducer and including an upper drive shaft portion having a first end connected to said drive nut and a second end connected to an outer shell of said linear motion transducer and a lower drive shaft portion having a first end connected to said traveling block and a second end connected to a pin inserted within said linear motion transducer, whereby relative movement of the pin and lower drive shaft portion in response to movement of said caliper arm relative to said first housing will be converted by said linear motion transducer to an electronic signal for transmission to receiving devices on the surface, said pin further including a shoulder engaging said shell whereby said electric gear motor may retract said traveling block, pad and caliper arm.

11. The compensated density well logging device of claim 10, further including a resilient bellows sealingly encircling said linear motion transducer, said bellows being filled with a low viscosity fluid or the like whereby pressure exerted by the drilling fluid is equalized with the low viscosity fluid and also equalized with the transmission train and gear motor, thereby eliminating dynamic sealing across the driving shaft and said linear motion transducer is protected from contamination by the drilling fluid.

12. The compensated density well logging device of claim 1, wherein one or more of the radiation detection means further includes a collimating shield for preventing saturation of the detection means.

13. The compensated density well logging device of claim 2, wherein a plurality of replaceable wear buttons are mounted on said pad and second pad support arm for preventing damage from sliding contact with the well bore.

14. The compensated density well logging device of claim 8 further including a natural gamma ray detection means mounted in said electric power source means for detecting the ambient level of radiation within the well bore formations.

15. The compensated density well logging device of claim 1, wherein said second housing is circular in cross-section and relatively narrow with respect to said first housing.

16. The compensated density well logging device of claim 10, wherein said outer shell is constructed of Titanium.

* * * * *